United States Patent [19]

Watanabe et al.

[11] Patent Number: 5,271,652
[45] Date of Patent: Dec. 21, 1993

[54] OPENING/CLOSING ASSISTING DEVICE FOR LOADING DECK SIDE PLATE

[75] Inventors: Yosio Watanabe, Fujinomiya; Masayoshi Ohishi, Fuji, both of Japan

[73] Assignee: Chuo-Seiki Kabushiki Kaisha, Shizuoka, Japan

[21] Appl. No.: 900,390

[22] Filed: Jun. 18, 1992

[51] Int. Cl.⁵ ............................................. B62D 33/03
[52] U.S. Cl. ................................... 296/36; 296/57.1; 296/146.1; 49/386; 16/80; 16/289; 105/378; 74/105
[58] Field of Search ............. 296/32, 36, 57.1, 146 R, 296/61; 16/80, 289; 49/386; 105/378; 74/105

[56] References Cited

U.S. PATENT DOCUMENTS

| | | | |
|---|---|---|---|
| 1,331,556 | 2/1920 | Blood | 16/289 X |
| 1,357,655 | 11/1920 | Sandell | 16/289 X |
| 3,842,542 | 10/1974 | White et al. | 49/386 |
| 4,165,121 | 8/1979 | Hori et al. | 296/57.1 |
| 4,580,315 | 4/1986 | Beckwith | 16/289 X |
| 4,742,598 | 5/1988 | Bruneau | 16/289 X |

FOREIGN PATENT DOCUMENTS 2616696 10/1976 Fed. Rep. of Germany .
51-129026 11/1976 Japan .
58-67570 4/1983 Japan .

Primary Examiner—Dennis H. Pedder
Attorney, Agent, or Firm—Nikaido, Marmelstein, Murray & Oram

[57] ABSTRACT

A device in which an auxiliary force is applied to a loading deck side plate of a truck to reduce the force required for opening and closing the side plate. A spring is provided on the underside of the loading deck to pull a rod substantially horizontally. A swing link is provided below a side end portion of the loading deck, and the tip of the swing link and an outer surface of the side plate are connected together through a connecting link in such a manner that the tip of the swing link points obliquely upward or downward when the side plate is closed or fully open, respectively. The tip of the rod and an intermediate portion of the swing link are connected together through an intermediate link. The underside of the intermediate link is brought into contact with a roller, or a link roller is provided on the underside of the intermediate link and is contacted with a rail member; thereby changing the direction and magnitude of the spring force exerted on the swing link, to obtain a desired auxiliary force varying characteristic. Since such a large-sized bell crank contained in the prior art is not used, the vertical size of the portion located inside the swing link can be reduced.

2 Claims, 4 Drawing Sheets

OPENING/CLOSING ASSISTING DEVICE FOR LOADING DECK SIDE PLATE

FIELD OF THE INVENTION

The present invention relates to an opening/closing assisting device to be attached to a loading deck side plate of a truck or the like for reducing the force required to open and close the side plate.

BACKGROUND OF THE INVENTION

Opening/closing assisting devices for loading deck side plates are generally of a structure wherein a spring mounted on the underside of a loading deck and a side plate are connected together with a link mechanism mounted on the underside of a side end of the loading deck. The spring bears a portion of the weight of the side plate so that the side plate can be opened and closed lightly. The link mechanism changes the direction of the spring force into approximately vertical direction so as to apply the force to the side plate from approximately a horizontal direction. And at the same time it changes the magnitude of the force according to the opening angle of the side plate. In other words, the link mechanism functions so that the assisting force is approximately zero when the side plate is in a full open or closed state and becomes maximum when the side plate is opened up to a substantially horizontal position. Usually, the link mechanism is constituted mainly by a bell crank (see, for example, Japanese Patent Laid Open No. 67570/83).

Consequently, the link mechanism portion becomes large-sized and particularly its vertical size becomes larger than that of the spring portion, resulting in that when used in a low floor vehicle, the link mechanism portion interferes with a fuel tank mounted on the underside of the loading deck and thus the mounting thereof causes many difficulties.

There is also known a construction using wire and pulley for changing the direction of force (see Japanese Patent Laid Open No. 129026/76). According to this construction, it is possible to make the vertical size smaller than that using a bell crank, but the durability is unsatisfactory because wire is used and it is impossible to change the magnitude of force by the pulley.

SUMMARY OF THE INVENTION

It is the object of the present invention to provide a link mechanism in an opening/closing assisting device, having a reduced vertical size and capable of setting a varying characteristic of the force magnitude.

The present invention resides in an opening/closing assisting device for a loading deck side plate, including a swing link mounted on the underside of a loading deck of a truck of the like and having a fulcrum positioned slightly inside a side edge or the loading deck; a connecting link for connecting a tip of the swing link and an outer surface of the side plate with each other in such a manner that the tip of the swing link points obliquely upward when the side plate is closed and points obliquely downward when the side plate is fully open; a spring disposed inside the swing link mounted on the underside of the loading deck; a rod which is pulled substantially horizontally toward the center of the loading deck by means of the spring; an intermediate link which connects a tip of the rod and an intermediate portion of the swing link with each other; and a roller with which the underside of the intermediate link is brought into contact and which makes the intermediate link transmit the force of the rod to the swing link as a rotating force while changing the direction and the magnitude of the force.

The present invention also includes a construction wherein, in the above device, the relation between the underside of the intermediate link and the roller is reversed, that is, the intermediate link is provided with a link roller and this link roller is brought into contact with a rail member.

DETAILED DESCRIPTION OF EMBODIMENTS

Embodiments of the present invention will be described below concretely with reference to the accompanying drawings.

An opening/closing assisting device 10 for a loading deck side plate according to an embodiment of the present invention is mounted on the underside of a side edge portion of a loading deck 11, and a side plate 13 is mounted on the side edge portion of the loading deck 11 with a hinge 12.

Figure 1:
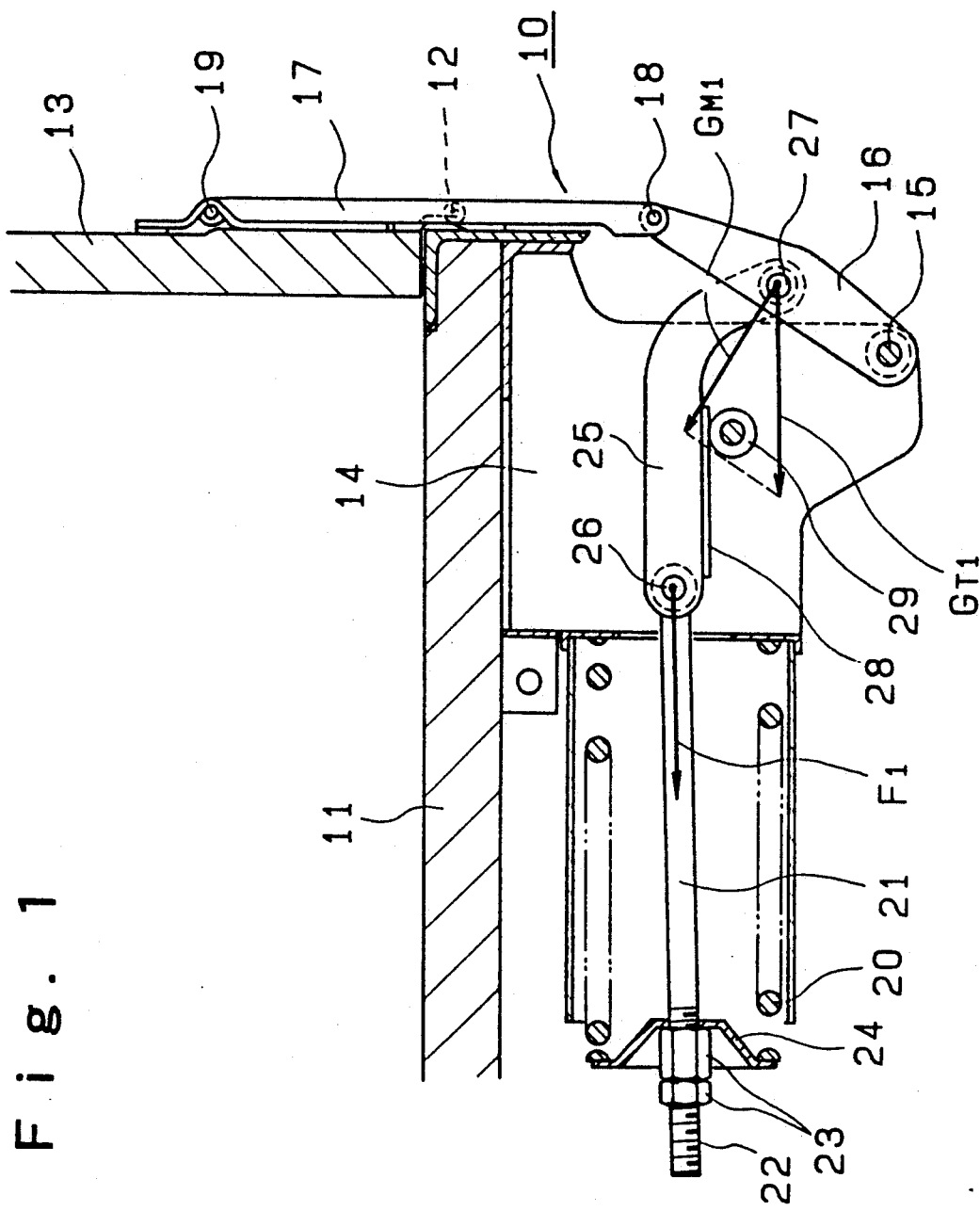
FIG. 1 is a sectional view of an opening/closing assisting device for a rear deck side plate according to an embodiment of the present invention, with the side plate being fully closed.
Figure 3:
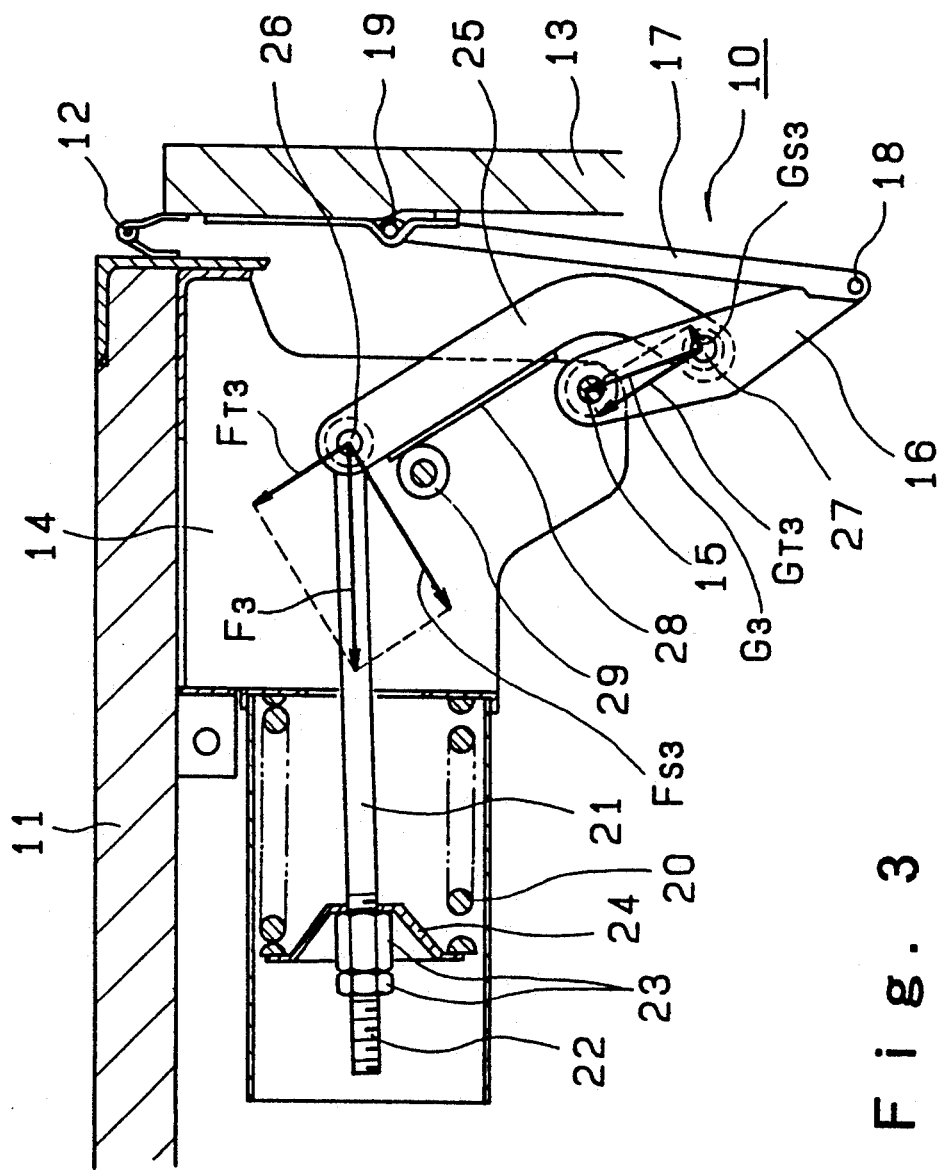
FIG. 3 is a sectional view thereof, with the side plate being fully open.

A frame 14 of the opening/closing assisting device 10 is mounted to the underside of the side edge portion of the loading deck 11 and it has a fulcrum 15 consisting of a pivot shaft positioned slightly inside of the side edge portion of the loading deck 11. A swing link 16 is supported rotatably by the fulcrum 15. To the tip of the swing link 16 is connected a connecting link 17 rotatably with a pin 18, and the tip of the connecting link 17 is mounted to an outer surface of the side plate 13 rotatably with a pin 19. The swing link 16 and the connecting link 17 are constructed in such a manner that, as shown in FIG. 1, when the side plate is fully closed, the tip of the swing link 16 points obliquely upward and the connecting link 17 extends along the outer surface of the side plate 13, then with an opening motion of the side plate 13, the swing link 16 moves with rotation, and when the side plate is fully open, the tip of the swing link 16 points obliquely downward, as shown in FIG. 3.

On a face of the frame 14 facing toward the center of the loading deck there is disposed a coiled spring 20 extending horizontally, with one end of the spring 20 being in abutment with the side face of the frame. A rod 21 extends through the spring 20, and nuts 23, 23 which are threadedly engaged with a screw formed at one end of the rod 21 press the other end of the spring 20 through a presser plate 24, so that the rod 21 is pulled substantially horizontally toward the center of the loading deck by the spring 20.

To the other end of the rod 21 is connected an intermediate link 25 rotatably with a pin 26, and to the tip of the intermediate link 25 is connected an intermediate portion of the swing link 16 with a pin 27. The portion of the intermediate link 25 closer to the rod 21 is rectilinear, while its portion closer to the swing link 16 is arcuate, and an abutment plate 28 is provided on the underside of the rectilinear portion.

A roller 29 mounted to the frame 14 while being supported by a shaft, and the abutment plate 28 of the intermediate link 25 comes into contact with the roller 29.

The opening/closing assisting device having the above construction operates in the following manner.

When the side plate is closed, the device 10 assumes the state shown in FIG. 1. In this state, a force $F_1$ of the spring 20 exerted on the intermediate link 25 operates on the pin 26 and substantially points horizontally leftwards. Since the operating direction of the force $F_1$ is in coincidence with the direction in which the intemediate link 25 is moving along the roller 29, the force is transmitted as it is to the pin 27 through the link 25, acting as force $G_{T1}$ on the swing link 16. Of the force $G_1$, a force $G_{T1}$ which causes a pivotal motion of the swing link 26 is as illustrated in FIG. 1.

Figure 2:
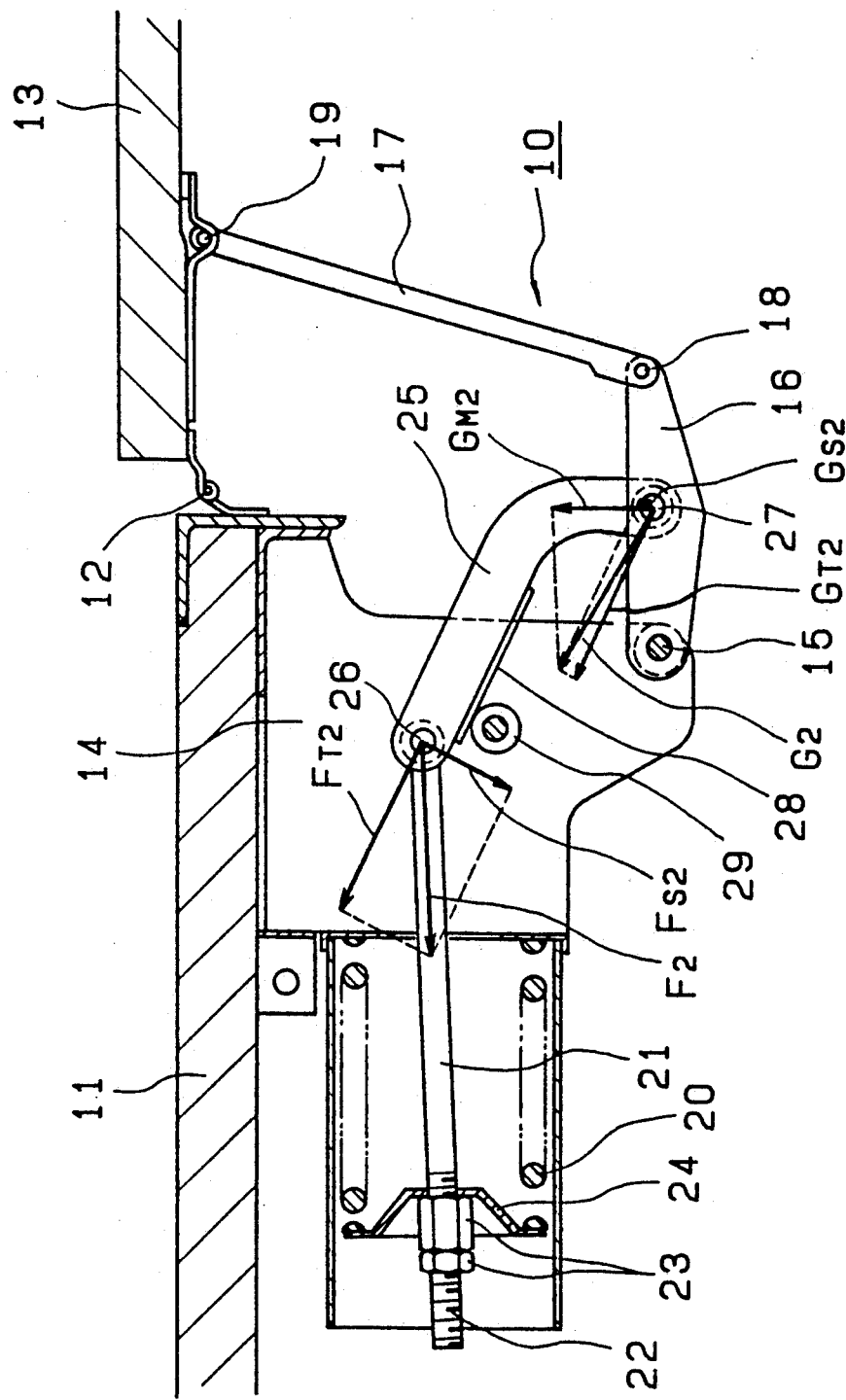
FIG. 2 is a sectional view thereof, with the side plate being opened up to a horizontal position thereof.

FIG. 2 shows a state in which the side plate has been opened up to a horizontal position. In this state, a force $F_2$ of the spring 20 exerted on the intermediate link 25 operates on the pin 26 and substantially points horizontally leftwards. Of the force $F_2$, a component $F_{T2}$ acting in the direction of the rectilinear portion of the intermediate link 25 is conincident with the direction in which the link 25 is movable along the roller 29, therefore the component $F_{T2}$ is transmitted as it is to the pin 27 through the intermediate link 25 and operates as force $G_{T2}$ on the swing link 16. Another componet of the force $F_2$, that is, a component $F_{S2}$ acting in a direction orthogonal to the rectilinear portion of the intermediate link 25, is transmitted to the pin 27 and operates on the swing link 16 as force $G_{S2}$ which points in the opposite direction at a magnitude corresponding to a reciprocal ratio of the distance between pin 26 and roller 29 to the distance between roller 29 and pin 27, as measured in the direction of the rectilinear portion, because the intermediate link 25 receives a reaction force (not shown) from the roller 29. Therefore, the force, indicated as $G_2$, operating on the swing link 16 is a compound of the forces $G_{T2}$ and $G_{S2}$. Of the force $G_2$, a force $G_{M2}$ which causes a rotating motion of the swing link 16 is as shown in FIG. 2.

When the side plate is fully open, the device assumes the state shown in FIG. 3. In this state, a force $F_3$ of the spring 20 exerted on the intermediate link 25 is divided into a component $F_{T3}$ acting in a direction of the rectilinear portion of the intermediate link 25 and a component $F_{S3}$ acting in a direction orthogonal thereto. These components are transmitted as forces $G_{T3}$ and $G_{S3}$ to the swing link 16 and are combined into a force $G_3$. Since force $G_3$ points toward the fulcrum 15, there will not be developed any force that causes a rotating motion of the swing link 16.

Although the forces $F_1$, $F_2$ and $F_3$ of the spring 20 are different by the extent of deformation of the spring, they are illustrated at the same magnitude in the drawings for the convenience of explanation. These differences in magnitude are not so great because the spring 20 is compressed at the time of mounting of the rod 21, and will never affect the following description.

As will be apparent from the above description, the intermediate link 25 and the roller 29 transmit the force of the spring 20 to the swing link 16 while changing the direction and magnitude thereof, therby imparting an auxiliary force to the side plate 13. In this embodiment, a moment exerted on the swing link 16 decreases gradually with opening of the side plate 13. For a constant moment on the link 16, the auxiliary force operating on the side plate becomes maximum when the side plate opened up to a horizontal position, and becomes zero in a full open or closed state of the side plate, as can be seen from the drawings. Thus, in this embodiment, the auxiliary force exerted on the side plate is zero when the side plate is fully closed or opened, and is maximum when the side plate is open at an angle somewhat smaller than that of its horizontal position, that is, becomes maximum when the side plate assumes a somewhat obliquely upward position. Although the force required for opening or closing the side plate becomes maximum when the side plate has been opened up to its horizontal position and becomes zero in a fully opened or closed state of the side plate, the above mentioned characteristic has been set for providing the best operability in actual manual operation, taking into account the fact that a large force is difficult to be exerted if the position of the side plate is high on the ground.

As is apparent from the drawings, moreover, a look at the entire shape of the opening/closing assisting device 10 shows that the vertical size of the portion of the frame 14 positioned on the inner side of the loading deck with respect to the fulcrum 15 is reduced to an extent approximately equal to the diameter of the spring 20.

Figure 4:
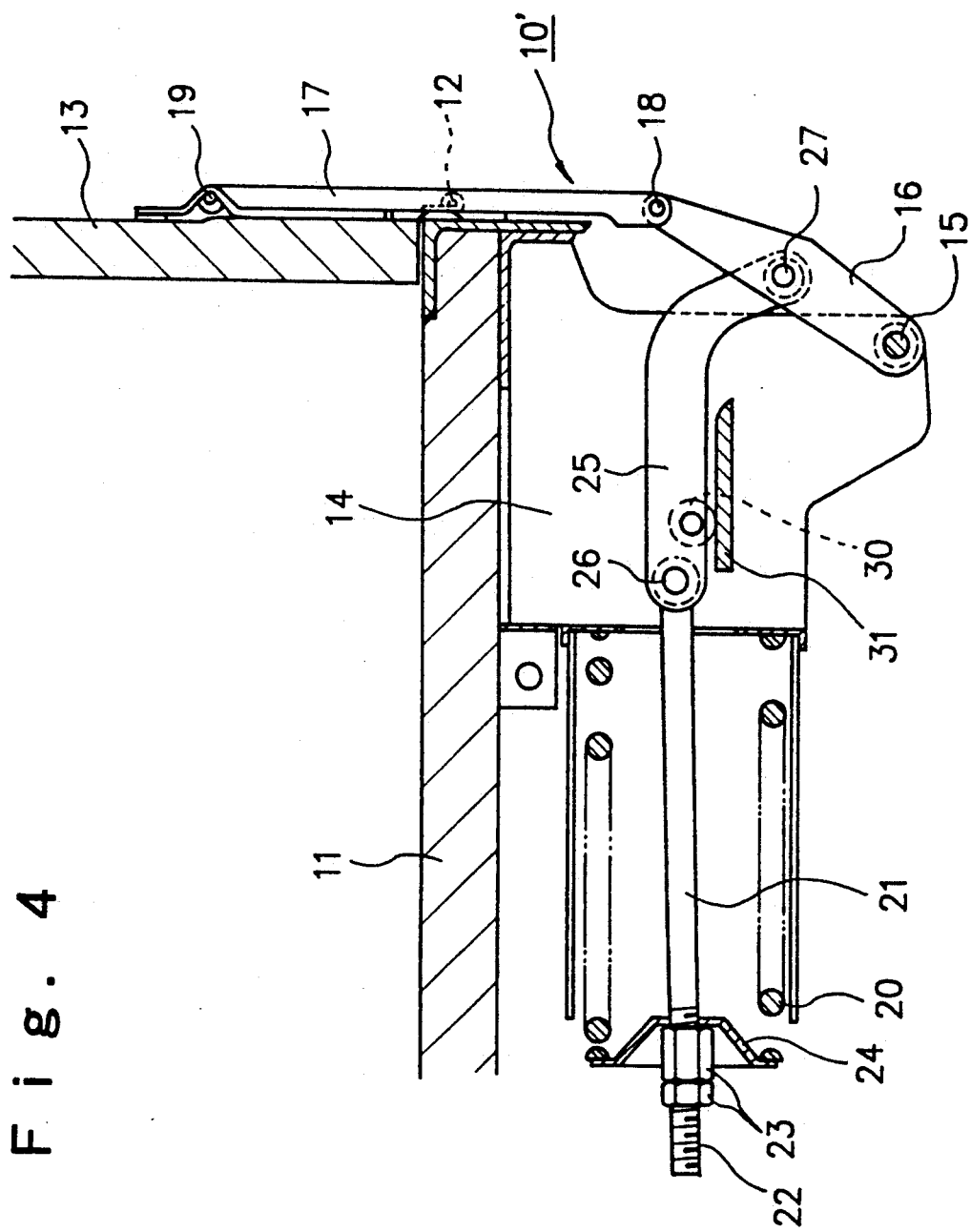
FIG. 4 is a sectional view of an opening/closing assisting device for a rear deck side plate according to another embodiment of the present invention, with the side plate being fully closed.

Referring now to FIG. 4, there is illustrated another embodiment of the present invention. An opening/closing assisting device 10' for a loading deck side plate of this embodiment is almost the same as the device 10 of the previous embodiment, different only in that a link roller 30 is provided in place of the abutment plate 28 mounted on the underside of the intermediate link 25, and that a rail member 31 is provided in place of the roller 29. It goes without saying that the device 10' of this embodiment also exhibit about the same function and effect as the device 10. In FIG. 4, the portions corresponding to those of the device 10 are indicated by the same reference numerals as in the previous drawings.

In the opening/closing assisting device for a loading deck side plate according to the present invention, as set forth above, the intermediate link cooperates with a roller or a rail member to change the direction of the spring force in the link mechanism portion, so the portion of the device positioned on the inner side of the loading deck with respect to the fulcrum portion of the swing link which is very close to a side edge portion of the loading deck, can be decreased in its height to about the same extent as the diameter of the spring used, thus permitting the device to be mounted without interference with a fuel tank even in a low floor vehicle.

In the mechanism using an intermediate link and a roller or a rail member according to the present invention, unlike the mechanism using a wire and a pulley, it is possible to change not only the direction of force but also the magnitude thereof. The mechanism is convenient in setting the varying characteristic of the auxiliary force to be applied to the side plate to a desired one.

What is claimed is:

1. An opening/closing assisting device for loading deck side plate, comprising:
   a swing link mounted on an underside of a loading deck and having a fulcrum positioned on an end of said swing link which is located inside a side edge of the loading deck;

a connecting link connecting another end of said swing link and an outer surface of the side plate with each other in such a manner that the another end of the swing link points obliquely upward with respect to said fulcrum when the side plate is closed and points obliquely downward with respect to said fulcrum when the side plate is fully opened;

a spring, disposed inside said swing link, mounted on the underside of the loading deck;

a rod which is pushed substantially horizontally toward a center of the loading deck by means of said spring;

an intermediate link connected to a tip of said rod and an intermediate portion of said swing link; and a roller with which an underside of said intermediate link is brought into contact and which makes the intermediate link transmit a force of said rod to said swing link as rotating force while changing a direction and magnitude of the force.

2. An opening/closing assisting device for a loading deck side plate, comprising:

a swing link mounted on an underside of a loading deck and having a fulcrum positioned on one end of said swing link which is located inside a side edge of the loading deck;

a connecting link connecting another end of said swing link and an outer surface of the side plate with each other in such a manner that the another end of the swing link points obliquely upward from said fulcrum when the side plate is closed and points obliquely downward from said fulcrum when the side plate is fully opened;

a spring, disposed inside said swing link, mounted on the underside of the loading deck;

a rod which is pushed substantially horizontally toward a center of the loading deck by means of said spring;

an intermediate link connected to a tip of said rod and an intermediate portion of said swing link; and a rail member with which a link roller, provided on the underside of said intermediate link, is brought into contact and which makes the intermediate link transmit a force of said rod to said swing link as rotating force while changing a direction and magnitude of the force.

* * * * *